(12) United States Patent
Wakil

(10) Patent No.: US 7,823,862 B2
(45) Date of Patent: Nov. 2, 2010

(54) TOILET LIFT AND TRANSPORT APPARATUS

(76) Inventor: Hussam Wakil, P.O. Box 23, Poway, CA (US) 92074

( * ) Notice: Subject to any disclaimer, the term of this patent is extended or adjusted under 35 U.S.C. 154(b) by 1218 days.

(21) Appl. No.: 11/416,444

(22) Filed: May 3, 2006

(65) Prior Publication Data

US 2007/0256238 A1 Nov. 8, 2007

(51) Int. Cl.
*B60P 1/48* (2006.01)
(52) U.S. Cl. ..................................... 254/8 R; 254/2 R
(58) Field of Classification Search ................ 254/8 R, 254/2 R, 7 R, 7 B, 2 B, 89 H, 93 R, 10 B; 4/661; 269/17
See application file for complete search history.

(56) References Cited

U.S. PATENT DOCUMENTS

| | | | | |
|---|---|---|---|---|
| 4,122,956 A | * | 10/1978 | Hargrove | ............... 211/126.14 |
| 4,722,511 A | | 2/1988 | Chitwood | |
| 4,793,646 A | * | 12/1988 | Michaud, Jr. | ............... 294/19.1 |
| 5,203,065 A | * | 4/1993 | Peters | ................... 29/281.4 |
| 5,373,593 A | * | 12/1994 | Decky et al. | ................ 4/661 |
| 5,381,707 A | * | 1/1995 | Gill | ................... 74/546 |
| 5,505,430 A | * | 4/1996 | Barnett | ................ 254/2 R |
| 5,515,574 A | * | 5/1996 | Larson | ................... 16/429 |
| 5,716,183 A | | 2/1998 | Gibson | |
| 6,135,466 A | * | 10/2000 | Irwin | ................... 280/47.28 |
| 6,752,379 B1 | | 6/2004 | Wall | |
| 7,240,909 B2 | * | 7/2007 | Robens | ................... 280/47.24 |
| 7,303,181 B1 | * | 12/2007 | Nymann | ................... 254/8 R |
| 7,334,774 B1 | * | 2/2008 | Lin | ................... 254/8 B |
| 2003/0015057 A1 | * | 1/2003 | Berdan et al. | ............. 74/544 |
| 2007/0256238 A1 | * | 11/2007 | Wakil | .................... 4/661 |

* cited by examiner

*Primary Examiner*—Lee D Wilson
(74) *Attorney, Agent, or Firm*—Eric Hanscom; Todd J. Langford

(57) ABSTRACT

This invention involves an apparatus for lifting and transporting toilets. The apparatus includes a base portion, at least two toilet lifting members, a toilet securing member, and a lifting mechanism. The toilet lifting members are configured for positioning underneath the bowl portion of a toilet. The toilet securing member extends upward from the base and contains a u-shaped upper portion that is designed to fit over the rim of the toilet bowl and secure to the inner portion of the toilet bowl. The lifting mechanism preferably comprises a handle attached to a piston. The base portion includes wheels for transport. The toilet lifting members and the toilet securing member contain a padded region for contacting the toilet to prevent damage. The toilet securing member is height adjustable to accommodate various sized toilets. An extension portion is provided for attachment to the u-shaped portion to secure larger toilets.

27 Claims, 4 Drawing Sheets

TOILET LIFT AND TRANSPORT APPARATUS

CROSS REFERENCE TO RELATED APPLICATIONS

None.

STATEMENT REGARDING FEDERALLY SPONSORED RESEARCH OR DEVELOPMENT

This invention was not federally sponsored.

BACKGROUND OF INVENTION

1. Field of the Invention

The invention generally relates to the field of transport apparatus. More particularly, the present invention relates to portable apparatus used to lift and transport toilets in a safe, convenient, and efficient manner, with special emphasis placed on ease of movement and lack of damage to the toilet and the underlying floor. The invention also provides a removably attached storage portion of the invention which allows a user to store one toilet as he/she transports another.

2. Description of the Related Art

Removing and installing a toilet can be a difficult and laborious task because of the heavy lifting involved. In many instances, toilet removal and installation requires two persons to complete because of the weight and large, cumbersome shape of the toilet, which can result in decreased productivity, increased installation cost, and potential damage to the toilet and the underlying floors of both the bathroom where the toilet is located and the floor over which the toilet is left while work is done in the bathroom. If one or more people have to physically carry the toilet with their arms, there is an increased chance of damage to the toilet and injury to the workers carrying the toilet. If only one person is present however, the toilet may have to be disassembled into its different components, with each component then being transported to the installation location for reassembly. While this helps to avoid weight and shape issues, it increases the time and effort needed to complete the installation process and further increases the chance that water will be spilled on the underlying floor.

Although several apparatus for transporting heavy objects are well known in the art, few are well-suited to transport irregularly shaped objects such as toilets, particularly considering the advantages that a transport device that can lift and transport a toilet, maintaining it in a level configuration, such that any water in the toilet does not splash up over the sides, can provide. As such, the use of these traditional transport apparatus, such as a standard dolly, can often lead to the toilet falling off and being damaged or the floor being damaged by the falling toilet. In addition, the person operating the transport apparatus can be injured by the falling toilet, and a toilet being transported with a jerky motion, or being transported with the toilet tank and bowl in a non-level configuration whereupon the danger of water splashing over the sides of the toilet at best inconveniences the workers installing the toilet and at worst damages the underlying floor. Several inventions have attempted to eliminate the above difficulties by designing an apparatus solely for transporting toilets. Although these inventions have been successful to help alleviate some difficulties, the inventions have also been deficient in certain respects.

For example, some prior inventions, such as U.S. Pat. Nos. 5,716,183 to Gibson, et. al, and 6,135,466 to Irwin, have required a user to secure the toilet to cross-members located on the transport device and then tilt the transport device at an angle towards the user so that the device can be rolled to a different location. These devices, while easy to use, still present the risk of the toilet falling off the transport device and being damaged. Also, because of the angular positioning of the device during transport, there is an increased risk that the toilet and device may fall onto the user during transport, causing substantial injury and that water may splash out of the toilet bowl or storage tank. The fact that using these "toilet dollies" requires the user to tilt the toilet back before moving it also creates other problems, such as increasing the chance that water may splash out of the tank or toilet bowl during transportation and making it harder to align the holes in the base portion of the toilet with the receptacle screws embedded in the floor. A further disadvantage of the toilet dollies is that they require a greater working space to swing around corners while transporting the toilets, as opposed to the current invention which, because of its design, can maneuver a toilet in relatively tight quarters. Other prior inventions attempting to eliminate difficulties in toilet transport are often bulky, cumbersome, and contain many components making them difficult and complicated to use by professionals and lay persons alike. U.S. Pat. No. 6,752,379 to Wall and U.S. Pat. No. 4,722,511 to Chitwood are examples of inventions which provide a mechanism by which toilets can be lifted, but do so in extremely complex and time-consuming manners.

Therefore, there is a current need for a portable toilet apparatus that is easy to use, does not involve heavy lifting by the user, and allows for the secure transport of a toilet while minimizing the risks of damage to the toilet and injury to the user. In this respect, before explaining at least one embodiment of the invention in detail it is to be understood that the invention is not limited in its application to the details of construction and to the arrangement of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

BRIEF SUMMARY OF INVENTION

It is a primary object of this invention to provide a portable apparatus that can be used to lift and transport toilets.

It is another object of this invention to provide a portable apparatus for lifting and transporting toilets that is easy to use.

It is a further object of this invention to provide a portable apparatus for transporting toilets that does not require the user to tilt the toilet during transport.

It is a yet a further object of this invention to provide a portable apparatus for transporting toilets that reduces the risk of the toilet falling off the transport apparatus.

It is still yet a further object of this invention to provide a portable apparatus for transporting toilets that does not require a substantial amount of effort by the user to lift the toilet.

It is another object of this invention to provide a portable apparatus for transporting toilets that can be operated by one person.

It is still yet a further object of this invention to provide a new apparatus in the field of transport apparatus.

A further object of the invention is to provide an apparatus to lift and transport toilets which keeps the toilet in a level configuration such that any water in the toilet bowl and toilet tank is less likely to splash out during lifting and transportation.

Another object of this invention is to provide an apparatus for lifting and transporting a toilet which has protective portions of the apparatus designed to protect the toilet from being scratched by the lifting portions of the invention during its lifting and transportation and prevent the toilet from slipping off the lifting portions of the invention.

Further objects of the invention include providing an apparatus for lifting and transporting a toilet which allows a user to lift the toilet a set amount above a floor and retain the toilet at that elevation while performing work on wax rings or aligning flange bolts.

An additional object of the invention is to provide a means by which the toilet can be temporarily stored in an upright position via a self-contained storage seat which removably slides into the invention and is easily installed and removed for times when it is desired to support one toilet off the floor while transporting and/or installing another toilet.

A final object of the invention is to provide means by which a person wishing to lift and move a toilet can secure the toilet to the apparatus such that the toilet does not fall during the lifting or transportation.

These objects and further objects and features of the invention will be apparent to one skilled in the art from the disclosure of the present invention as set forth herein.

This invention involves an apparatus for lifting and transporting toilets. The apparatus includes a base portion with at least two stabilizing members, at least two toilet lifting members, a toilet securing member, and a lifting mechanism. The toilet lifting members are configured for positioning underneath the bowl portion of a toilet. The toilet securing member extends upward from the base and contains a u-shaped upper portion that is designed to fit over the rim of the toilet bowl and secure the inner portion of the toilet bowl. The lifting mechanism preferably comprises a handle attached to a piston, which can be hydraulic, rack and pinion, or some other piston known in the art. The base portion includes wheels for transport. The toilet lifting members and the toilet securing member may contain a padded region for contacting the toilet to prevent damage to the toilet and to prevent slippage of the toilet. The toilet securing member is height adjustable to accommodate various sized toilets. An extension portion is provided for attachment to the u-shaped portion to secure larger toilets.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto.

BRIEF DESCRIPTION OF THE DRAWINGS

The accompanying drawings, which are incorporated in and form a part of this specification, illustrate embodiments of the invention and together with the description, serve to explain the principals of this invention.

DETAILED DESCRIPTION OF THE INVENTION

Figures 1, 2:
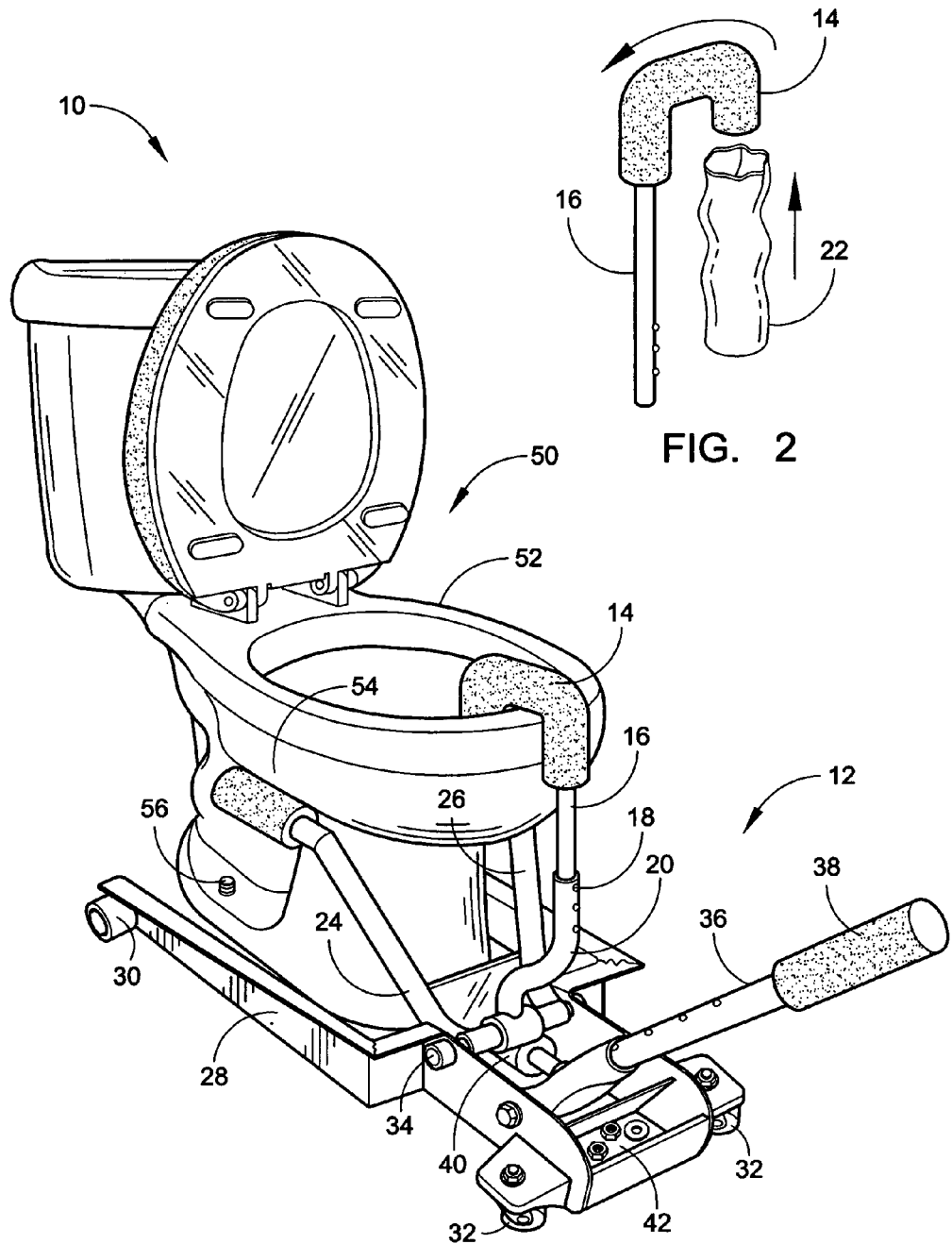
FIG. 1 shows a perspective view of the preferred embodiment of the toilet lift and transport apparatus having a toilet secured thereto.
FIG. 2 shows a detailed view of the upper portion of the toilet securing member and an extension member for connection thereto.

Referring now to the drawings, wherein similar parts are identified by like reference numerals, FIG. 1 shows perspective view of the preferred embodiment of the toilet lift and transport apparatus 10 having a toilet 50 secured thereto. Apparatus 10 includes a toilet securing member 12 having a u-shaped portion 14, inner tubular member 16, and outer tubular member 20 having holes 18 therein. U-shaped portion 14 is designed to hook over the rim 52 of the toilet bowl 54, providing a secure attachment to toilet 50. U-shaped member 14 is preferably padded with foam or other protective material to minimize damage to toilet 50. Inner tubular member 16 is designed to be slidably disposed within outer tubular member 20, and locked into place by a spring-loaded pin 19 that can pass through one of holes 18, such that inner tubular member can be adjusted up or down to accommodate toilets 50 having various sized bowls 54. Toilet securing member 12 is attached to a base 28 via a connecting bolt 34, allowing toilet securing member 12 to be rotated about connecting bolt 34 to allow for u-shaped portion 14 to engage or disengage with toilet 50.

Apparatus 10 also includes toilet lifting members 24 and 26 to help lift and support toilet 50 during transport. Lifting members 24 and 26 preferably engage toilet 50 underneath bowl 54. Apparatus 10 preferably includes two lifting members, but can include either one lifting member having a u-shape, or more than two lifting members to provide additional stability. It is also envisioned that the lifting members can extend, preferably, from the same portion of the invention from which the toilet securing member 12 extends, but that the lifting members can also be attached at other locations along the stabilizing arms. Lifting members 24 and 26 are preferably connected to base 28 via connecting bolt 34, allowing lifting members 24 and 26 to be rotated about connecting bolt 34 to allow for the lifting of toilet 50 off the ground and to allow lifting members 24 and 26 to be lowered towards base 28 for storage purposes. Lifting members 24 and 26 preferably contain padded regions 25 (only one shown) to help prevent damage to toilet bowl 54 during lifting and transport, and to prevent the toilet from slipping off lifting members 24 and 26 during lifting and transport. Lifting members 24 and 26 also contain an angular bend 27 that allows a user to securely transport toilet 50 without having to raise toilet 50 a large distance off of the ground.

Base 28 also includes a handle 36 to allow a user to raise and lower toilet 50. Handle 36 contains a padded region 38 at the top thereof to provide a comfortable grip for a user. Handle 36 contains a plurality of holes 37 for engaging a spring loaded pin 39 located on an inner handle portion (not shown), to allow a user to adjust handle 36 to a comfortable operating length. Handle 36 is attached to a handle connection portion 41 that is secured to base 28 via a handle connector bolt 43. Handle connection portion 41 is attached to a shaft 45 that drives a piston 40, preferably a hydraulic piston but rack and pinion and other types of driving devices are envisioned, that drives lifting members 24 and 26 to lift toilet 50.

Base 28 preferably includes a toilet receiving region formed in the area between two stabilizer members 21 and 23. It is envisioned that stabilizer members can be made preferably in a length whereby they allow the toilet, after lifting, to be balanced in the center of gravity between the various wheels contained in the invention. Stabilizer members 21 and 23 are used to help support toilet 50 while it is being lifted and transported. Base 28 also includes two swivel wheels 32 attached on one end 29 of the bottom thereof. Swiveling wheels 32 help a user to steer apparatus 10 during transport of apparatus 10. It is also envisioned that a variety of wheel types could be used, including iterations where the front wheels swivel and the back wheels are stationary, where the front wheels are stationary and the back wheels swivel, and where all wheels swivel. Also, base 28 includes two fixed wheels 30 (one shown), one attached to the bottom of each of stabilizer members 21 and 23, that help apparatus 10 roll along a surface during transport. It is envisioned that the wheels can be made from a variety of substances in a variety of configurations, including inflatable and solid wheels made from rubber, plastic, metal, and, preferably, a PCV material that flexes slightly when compressed, thereby allowing a user of the invention to wheel a toilet across of floor and not leave any dents or creases in the floor. Base 28 can further include a storage compartment 42 for holding various nuts and bolts.

To operate apparatus 10, a user positions stabilizer members 21 and 23 around toilet 50 and elevate lifting members 24 and 26 so that they contact the lower portion of bowl 54. The user can then unscrew flange bolts 56 located at the base of toilet 50 to allow toilet 50 to be lifted off the ground. Next, toilet securing member 12 can be adjusted upward and swiveled around the rim 52 of bowl 54, then adjusted downward and securely around rim 52 to provide a secure attachment during lifting. A user can then adjust handle 36 to a comfortable length and move handle 36 up and down to cause shaft 45 to drive piston 40 to cause lifting members 24 and 26 to lift toilet 50. After toilet 50 is lifted off the ground, the user can then roll toilet 50 to a desired location and reverse the process to lower the toilet and remove it from apparatus 10.

FIG. 2 shows a detailed view of the upper portion of toilet securing member 12 and an extension member 22 for connection thereto. Extension member 22 can be designed to either fit over or fit within u-shaped member 14, by moving extension member 22 upwards towards and onto u-shaped member 14 as illustrated by arrow 13. Extension member 22 is used to help toilet securing member 12 secure toilets having large bowls to apparatus 10. Extension member 22 can be curved in shape to mimic the grooves of various toilet bowls and provide a more secure attachment.

Figure 3:
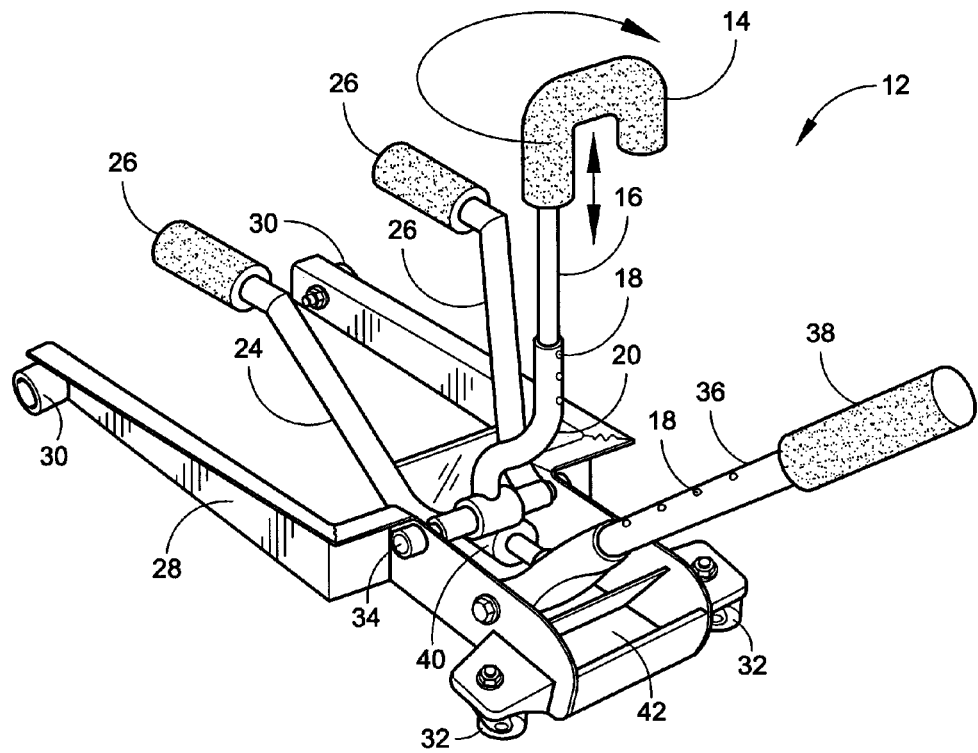
FIG. 3 shows a perspective view of the preferred embodiment of the toilet lift and transport apparatus, illustrating the rotational and adjustment capabilities of the toilet securing member.

FIG. 3 shows a perspective view of apparatus 10 with no toilet attached. This figure illustrates the rotational and adjustment capabilities of toilet securing member 12. As shown by arrow 15, u-shaped member 14 can be swiveled 360 degrees about inner tubular member 16 to allow unshaped member 14 to be attached to or disengaged from a toilet bowl rim. Also, u-shaped member 14 can be adjusted up or down, as shown by arrow 17, to allow u-shaped member 14 to be positioned over toilets having various sized bowls. With toilet securing member 12 and lifting members 24 and 26 in the position as illustrated in this figure, a user can roll apparatus 10 up to a toilet, adjust and swivel u-shaped member 14 to secure it to the toilet bowl, and use handle 36 to lift the toilet. The preferred embodiment has handle 36 lifting the toilet through and up and down pumping action, but it is also conceivable that the lifting action could be accomplished through having the handle have a wheel or bar attached to its outer end such that a user of the invention could turn a wheel or bar and the twisting motion could be translated, through gears, in the lifting motion required to elevate the toilet for transportation.

Figure 4:
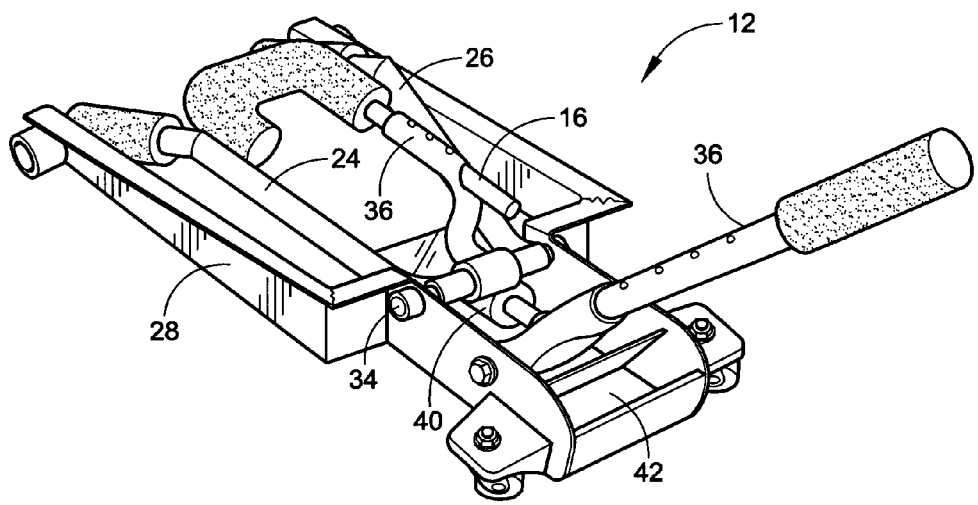
FIG. 4 shows a perspective view of the preferred embodiment of the toilet lift and transport apparatus with the lifting members and the toilet securing member in the storage position.

FIG. 4 shows a perspective view of apparatus 10 with lifting members 24 and 26 and toilet securing member 12 in the storage position. In this position, lifting members 24 and 26 and toilet securing member 12 are lowered towards and rest upon base 28 for convenient transport and storage. In this handle 36 has not yet been removed from its sleeve for storage, but this action can be accomplished easily through depressing the spring loaded pin 39 and pulling upward on handle 36, after the invention has been pulled to its storage location.

Figure 5:
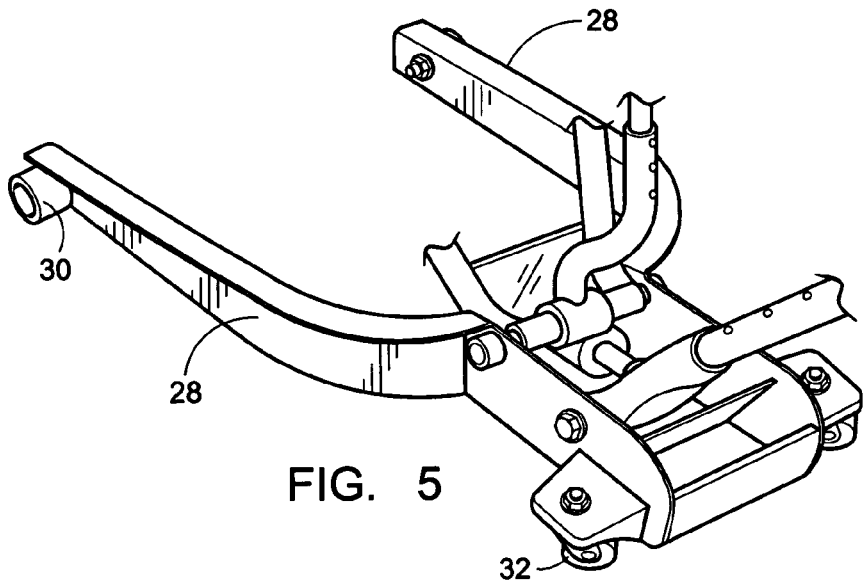
FIG. 5 shows a top view of the stabilizing members in an alternate configuration.

FIG. 5 shows a top view of the stabilizing members 28 in an alternate configuration. Rather than the "car jack" look of FIGS. 1-4, this iteration relies upon curved stabilizing members 28 which wrap around the toilet bowl an aesthetically pleasing, roughly semicircular shape which more closely approximates the shape of an average toilet bowl.

Figure 6A:
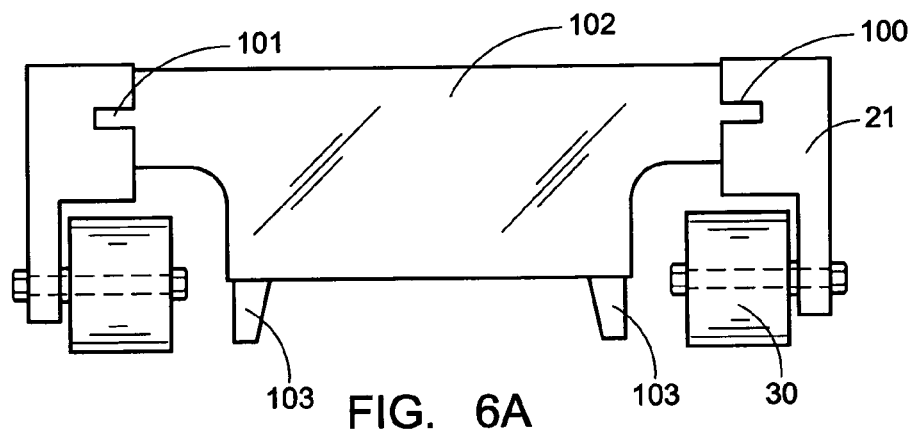
FIG. 6 shows two embodiments, both in cross sectional view, of the storage seat that is used to temporarily store a toilet in a manner which does not allow the toilet to damage the underlying floor and decreases the chance of water leaking out of the toilet onto the floor.
Figure 6B:
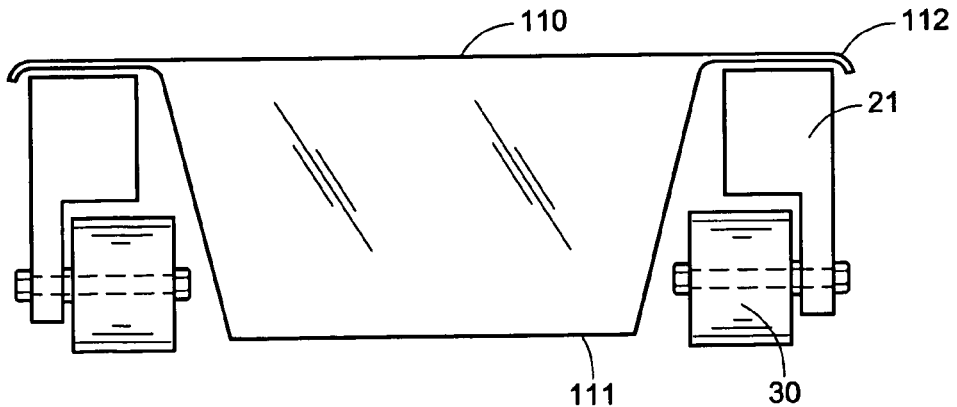
Figure 6C:
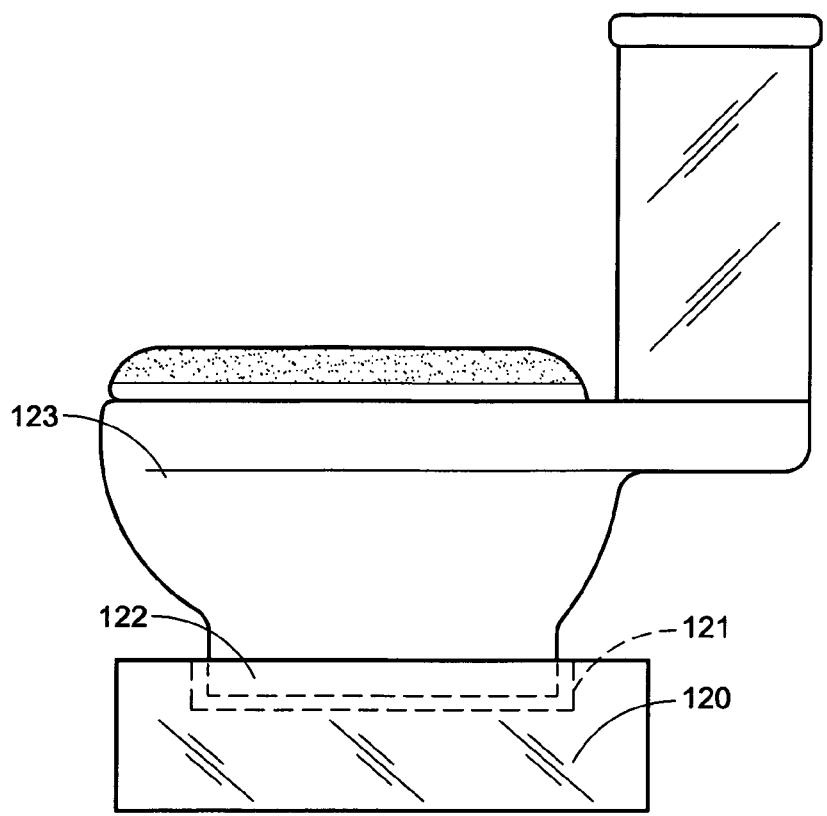

FIG. 6 shows two embodiments, both in cross sectional view, of the storage seat that is used to temporarily store a toilet in a manner which does not allow the toilet to damage the underlying floor and decreases the chance of water leaking out of the toilet onto the floor. FIG. 6A shows the stabilizing members 21 attached to the wheels 30, with a groove 100 in the side of stabilizing members 21, into which a protrusion 101 from a toilet storage seat 102 rests. Protrusion 101 extends from one end of the toilet storage seat to the other. The toilet storage seat 102 may, optionally, have legs 103 which elevate storage seat 102 off the ground. The storage seat 102 is conveniently stored within groove 100 and can be easily removed when necessary, by merely pulling it out, whereupon it becomes a suitable seat or base upon which a toilet can be stored. For example, if a worker is replacing an old toilet with a new one, he/she would benefit from resting the old toilet on the toilet storage seat rather than risking damage to the floor by resting it on the floor while using the invention to carry and install the new toilet seat. FIG. 6B is another iteration of the toilet storage seat 110, this time with an overhanging lip 112, that extends outward beyond the outer edge of stabilizing member 21 and curves downward, thereby locking itself over stabilizing member 21 until needed. FIG. 6B also illustrates a toilet storage seat with a flat bottom 111, rather than a bottom with legs. FIG. 6C is a side view of a toilet 123, resting on a toilet storage seat 120, which has a depression 121 into which the base 122 of the toilet 123 fits snugly. It is envisioned that toilet storage seat can be made in both universal models, which are generally designed to fit a wide variety of toilet bases, and model-specific versions which are specifically designed to fit one brand and/or model of toilet.

Figure 7:
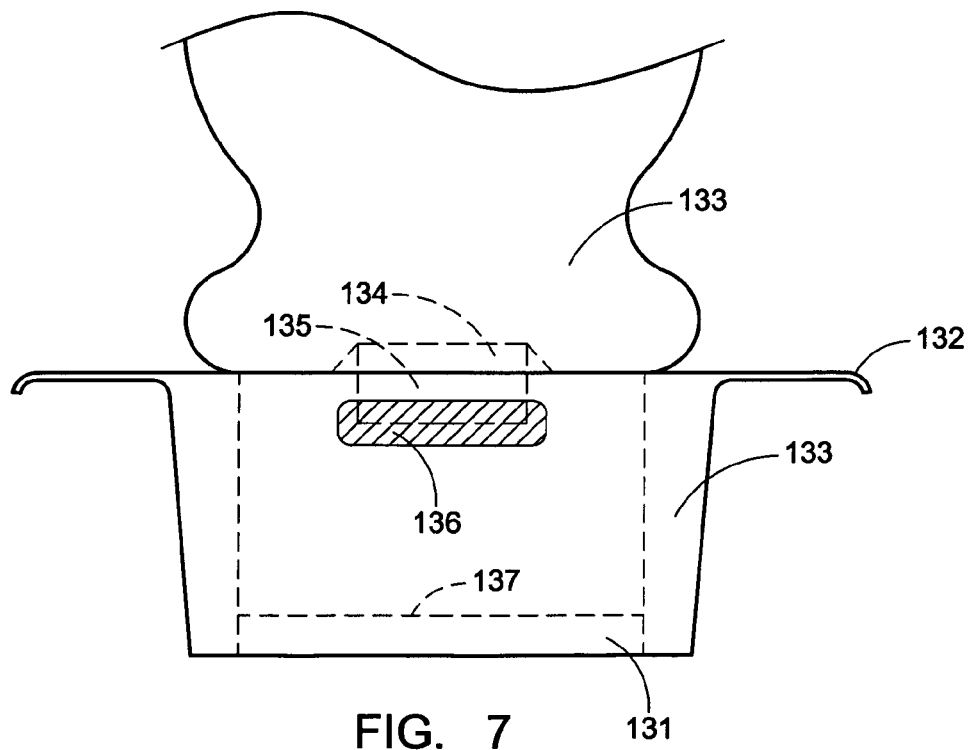
FIG. 7 shows a cross sectional view of another iteration of the storage seat in which there is a hollow center into which a wax ring/flange receptacle can hang without touching the floor.

FIG. 7 shows a cross sectional view of another iteration of the toilet storage seat 130 in which there is a hollow center 131 into which a wax ring 136/flange receptacle 134 can hang without touching the floor. This iteration also illustrates an optional bottom 137 which can catch any drips from toilet 133 or catch wax ring 136 if it falls off flange receptacle 134.

With respect to the above description it is to be realized that the optimum dimensional relationships for the parts of the invention, including variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents fall within the scope of the present invention.

The above description, together with the advantages of the invention and the various features of novelty which characterize the invention, are pointed out with particularity in the claims annexed to and forming a part of this disclosure. For a better understanding of the invention, its operating advantages and the specific advantages attained by its uses, reference should be made to the accompanying drawings and descriptive matter in which there are illustrated preferred embodiments of the invention.

Further, the purpose of the foregoing abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention, which is measured by the claims, nor is it intended to be limiting, as to the scope of the invention in any way.

What is claimed is:

1. An apparatus for lifting and transporting a toilet comprising:
   a) a base, the base having a central portion, at least two stabilizing members extending from the central portion, and at least two wheels attached to the base for allowing the base to roll along a surface;
   b) at least two lifting members attached to the base;
   c) at least one toilet securing member attached to the base, the at least one toilet securing member having a u-shaped top portion for the purpose of attachment to the rim of a toilet bowl, where the at least one toilet securing member comprises an inner tubular member and an outer tubular member, where the inner tubular member is slidably disposed within the outer tubular member; and
   d) means for adjusting the at least two lifting members whereby a user can position the apparatus near toilet, with the stabilizing members substantially surrounding the toilet base, use the means for adjusting the at least two lifting members to raise the at least two lifting members to contact the lower portion of the toilet bowl, secure the u-shaped top portion to the rim of a toilet bowl, and use the means for adjusting the at least two lifting members to raise the at least two lifting members, thus raising the toilet off of the ground and allowing the user to transport the toilet.

2. The apparatus for lifting and transporting a toilet of claim 1 further comprising an extension portion for attachment to the u-shaped top portion for the purpose of allowing the at least one toilet securing member to engage with toilets having large bowls.

3. The apparatus for lifting and transporting a toilet of claim 1, wherein the at least two lifting members attached to the base and at least one toilet securing member attached to the base are attached to the base at substantially the same location.

4. The apparatus for lifting and transporting a toilet of claim 1, where the at least two stabilizing members are configured with substantially straight lines and extend at substantially parallel lines along side the longer sides of the base.

5. The apparatus for lifting and transporting a toilet of claim 1, where the at least two stabilizing members are configured with substantially curved lines and extend in a curved manner around the curvature of the toilet along the longer sides of the base of the toilet.

6. The apparatus for lifting and transporting a toilet of claim 1, additionally comprising a toilet storage seat, which comprises a substantially flat, rectangular box-shaped structure where the toilet storage seat is suitably flat to retain a toilet in an upright position without additional support, additionally comprising means of storing the toilet storage seat in removable attachment with the at least two stabilizing members.

7. The apparatus for lifting and transporting a toilet of claim 6, where each of the at least two stabilizing members additionally comprises a groove, and the toilet storage seat additionally comprises a protuberance extending along both sides of the toilet storage seat which is of a size which fits into the groove, such that the toilet storage seat can be slid into the groove on the at least two stabilizing members when the apparatus is not in use, and easily removed from the apparatus when desirable to store a toilet upon the toilet storage seat.

8. The apparatus for lifting and transporting a toilet of claim 6, where each of the toilet storage seat additionally comprises a lip extending along both sides of the toilet storage seat extends outward beyond the outer edge of the at least two stabilizing members, such that the toilet storage seat can be slid over the top of the at least two stabilizing members when the apparatus is not in use, and easily removed from the apparatus when desirable to store a toilet upon the toilet storage seat.

9. The toilet storage seat of claim 6, where the toilet storage seat additionally comprises a hollow cavity substantially in the center of the toilet storage seat.

10. The toilet storage seat of claim 9, where the cavity is bounded on the cavity's lower portion by a solid bottom which is waterproof.

11. The apparatus for lifting and transporting a toilet of claim 1, wherein the base further includes a compartment located therein for storing small objects.

12. The apparatus for lifting and transporting a toilet of claim 1, wherein the at least two lifting members contain padding on the distal ends thereof for the purpose of preventing slippage and damage to the toilet during lifting and transport.

13. The apparatus for lifting and transporting a toilet of claim 1, wherein the u-shaped top portion is surrounded by padding for the purpose of preventing damage to the toilet during lifting and transport.

14. The apparatus for lifting and transporting a toilet of claim 1, wherein the means for adjusting the at least two lifting members is a handle portion connected to a shaft that drives a piston.

15. The apparatus for lifting and transporting a toilet of claim 14, wherein the piston is a hydraulic piston.

16. The apparatus for lifting and transporting a toilet of claim 14, wherein the handle portion is adjustable in length.

17. The apparatus for lifting and transporting a toilet of claim 14, wherein the handle portion comprises an outer tubular member and an inner tubular member slidably disposed within the outer tubular member, the outer tubular member having a plurality of holes therein, the inner tubular member having a spring-loaded pin positioned therein for engagement with one of the plurality of holes, whereby a user can depress the pin and slide inner tubular member up or down to vary the length of the handle portion.

18. The apparatus for lifting and transporting a toilet of claim 14, wherein the handle portion contains padding on the distal end thereof for the purpose of providing a user a comfortable grip surface.

19. The apparatus for lifting and transporting a toilet of claim 1, wherein the means for adjusting the at least two lifting members is a handle portion connected to hydraulic piston.

20. The apparatus for lifting and transporting a toilet of claim 1, wherein the toilet securing member is adjustable in height.

21. The apparatus for lifting and transporting a toilet of claim 1, wherein the toilet securing member is rotatable on an axis perpendicular to the base for the purpose of allowing the u-shaped top portion to engage and disengage from a toilet.

22. An apparatus for lifting and transporting a toilet comprising:
   a) a base, the base having a central portion, at least two stabilizing members extending from the central portion, and at least two wheels attached to the base for allowing the base to roll along a surface;
   b) at least two lifting members attached to the base, the at least two lifting members having padding on the distal ends thereof for the purpose of preventing slippage and damage to the toilet during lifting and transport;
   c) at least one toilet securing member attached to the base, the at least one toilet securing member being adjustable in height and having a u-shaped top portion for the purpose of attachment to the rim of a toilet bowl, where the at least one toilet securing member comprises an inner tubular member and an outer tubular member, where the inner tubular member is slidably disposed within the outer tubular member; and
   d) means for adjusting the at least two lifting members whereby a user can position the apparatus near toilet, with the stabilizing members substantially surrounding the toilet base, use the means for adjusting the at least two lifting members to raise the at least two lifting members to contact the lower portion of the toilet bowl, secure the u-shaped top portion to the rim of a toilet bowl, and use the means for adjusting the at least two lifting members to raise the at least two lifting members, thus raising the toilet off of the ground and allowing the user to transport the toilet.

23. The apparatus for lifting and transporting a toilet of claim 22, wherein the means for adjusting the at least two lifting members is a handle portion connected to a shaft that drives a piston.

24. The apparatus for lifting and transporting a toilet of claim 22, wherein the handle portion is adjustable in length.

25. The apparatus for lifting and transporting a toilet of claim 22, wherein the means for adjusting the at least two lifting members is a handle portion connected to hydraulic piston.

26. The apparatus for lifting and transporting a toilet of claim 22, wherein the u-shaped top portion is surrounded by padding for the purpose of preventing slippage and damage to the toilet during lifting and transport.

27. The apparatus for lifting and transporting a toilet of claim 22 further comprising an extension portion for attachment to the u-shaped top portion for the purpose of allowing the at least one toilet securing member to engage with toilets having large bowls.

* * * * *